E. D. CHAPLIN.
ART OF PRODUCING PIGMENTS BY ELECTROLYSIS.
APPLICATION FILED FEB. 3, 1906.
906,102. Patented Dec. 8, 1908.
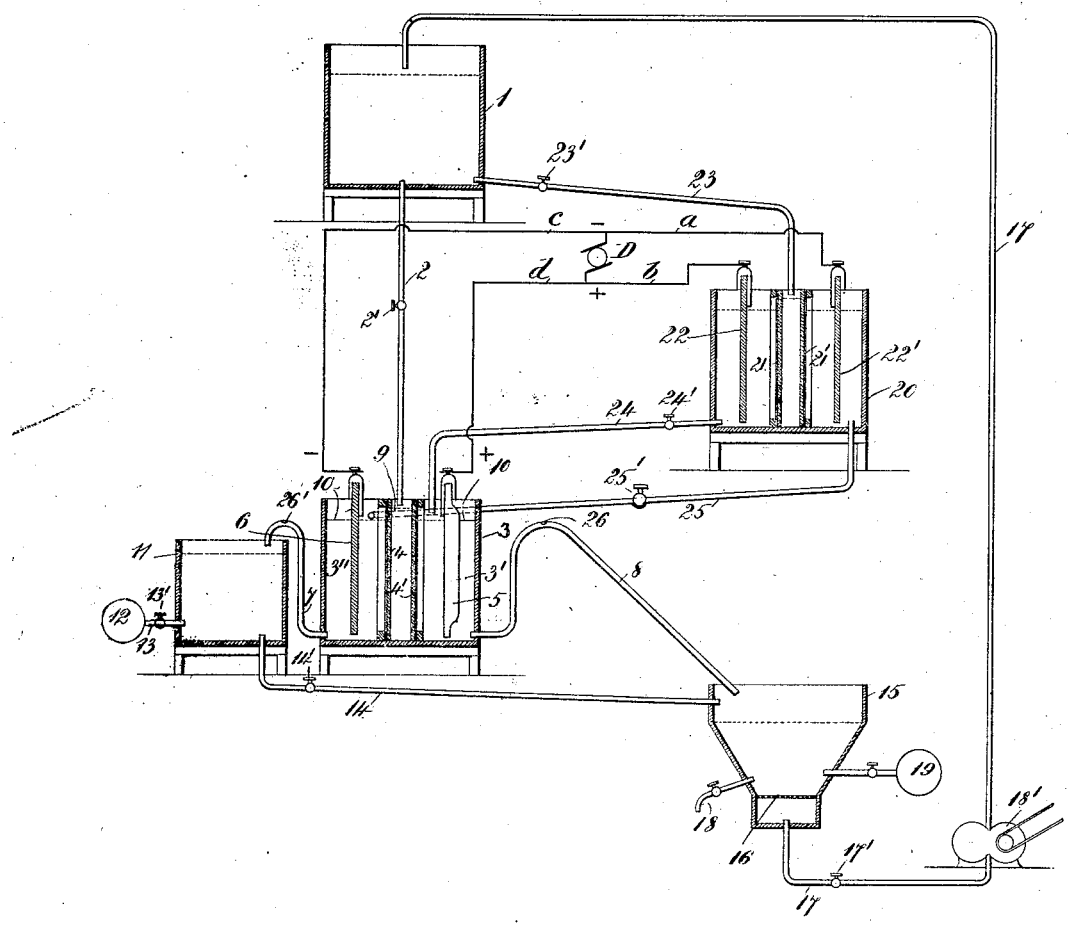
WITNESSES:
E. B. Tomlinson
Patrick J. Conroy
INVENTOR:
Edwin D. Chaplin
by Browne & Woodworth
his attorneys.

UNITED STATES PATENT OFFICE.

EDWIN D. CHAPLIN, OF BOSTON, MASSACHUSETTS, ASSIGNOR TO INTERNATIONAL LEAD COMPANIES, A VOLUNTARY ASSOCIATION.

ART OF PRODUCING PIGMENTS BY ELECTROLYSIS.

No. 906,102.  Specification of Letters Patent.  Patented Dec. 8, 1908.

Application filed February 3, 1906. Serial No. 299,235.

*To all whom it may concern:*

Be it known that I, EDWIN D. CHAPLIN, a citizen of the United States, and a resident of Boston, in the county of Suffolk and State of Massachusetts, have invented a new and useful Improvement in the Art of Producing Pigments by Electrolysis, of which the following is a specification.

My invention relates to the art of producing pigments by electrolysis and it relates more particularly to a process for so producing white lead or lead carbonate.

In the manufacture of lead carbonate by electrolysis, I prefer to employ an electrolyte which under the influence of the electric current will separate into a solvent of lead and an alkaline hydrate and thereby to produce in the anode compartment containing metallic lead, which may be the anode of the electrolyzer, a solution of a soluble salt of lead, and in the cathode compartment, an alkaline hydrate. I have found it essential to the commercial production of white lead to maintain the lead solution and the alkaline hydrate separate and not to produce any lead precipitate in the electrolyzer itself. I have also found it essential to employ some means, such as an oxidizing agent, to prevent the formation of insoluble salts of lead in the electrolyzer.

An indirect process involving the principles above briefly set forth, is described in United States Letters Patent No. 563,553, dated July 7, 1896, granted to A. B. Browne and myself, and according to said process the aforesaid soluble salt of lead is precipitated by the aforesaid alkaline hydrate to produce lead hydrate, and said lead hydrate is then carbonated in any suitable manner.

The object of the present invention is to provide a direct process of electrolytically producing white lead, or one wherein the soluble salt of lead is directly carbonated without first precipitating lead hydrate therefrom. I have discovered that the products obtained by the indirect process described in the aforesaid patent and by the direct process described in the present application differ in molecular structure, and that for some purposes one product, and for other purposes the other product, is preferred by painters.

My invention may best be understood by having reference to the drawing which accompanies and forms a part of this specification, and which illustrates in diagrammatic form one arrangement of apparatus and circuits whereby my process may be carried into effect; but it is to be understood that my process is broader than mere apparatus and may be carried into effect by a great variety of apparatus and circuit arrangements.

In the drawing, the figure represents an apparatus and system of circuits for electrolytically producing white lead.

In the figure, 1 represents a supply tank containing an electrolyte which, under the influence of the electric current, will be separated into a solvent of lead and an alkaline hydrate. I prefer to employ as an electrolyte, an aqueous solution of a non-alkaline salt such as a nitrate or an acetate of an alkaline base, for example sodium nitrate.

3 represents an electrolyzer divided into an anode compartment 3' and a cathode compartment 3'', by means of the foraminous diaphragms 4 4', between which is formed a compartment for receiving the electrolyte from the tank 1 through the pipe 2, which is provided with a valve 2'. For the purpose of preventing a mixture of the anolyte and catholyte in the electrolyzer and consequently a precipitation of lead hydrate in the electrolyzer, I may maintain a preponderance of pressure on the inner sides of said diaphragms, preferably by maintaining the level of the electrolyte between the diaphragms higher than the level of the anolyte and catholyte. The level of the electrolyte in the compartment between the diaphragms is indicated by the dotted line 9, and the level of the anolyte and catholyte, which is governed by the height of the bends of the outlet pipes 7 and 8, is indicated by the dotted lines 10, 10. In order to prevent said outlet pipes from siphoning the liquids out of the electrolyzer, the upper portion of each of said bends may be provided with an opening 26, 26' to equalize the atmospheric pressure on the columns of liquid in the two portions of each of said pipes.

The lead to be operated upon is placed in the anode compartment and may form the anode of the electrolyzer. In the present case the lead is shown in the form of a lead pig 5, connected by the conductor $d$, to the positive pole of the dynamo D, or other suitable source of current. The cathode of the electrolyzer 6 may consist of copper or any other suitable metal, and is connected by the conductor $c$ to the negative pole of the dynamo.

When the valve 2' is opened and the electrolyzer is charged with a suitable electrolyte from the supply tank 1, the current from the source D is passed through said electrolyte and decomposes the same into a solvent of lead and an alkaline hydrate. The lead is dissolved by its solvent, producing thereby a solution of a soluble salt of lead in the anode compartment 3', which solution is drawn off by means of the pipe 8 into the precipitating tank 15. The alkaline hydrate is drawn off by the pipe 7 into the tank 11, where it may be converted into an alkaline carbonate by subjecting it to the action of carbon dioxid, which may be formed in any suitable manner in the generator 12, and which may be conducted into the tank 11, by means of the pipe 13 provided with a valve 13'.

The alkaline carbonate so formed is drawn off through the pipe 14, provided with the valve 14', into the precipitating tank 15, where it is mixed with the soluble lead salt and converts the latter into lead carbonate. The lead carbonate so formed settles upon the filter 16 at the bottom of the tank 15, while the filtrate, which is substantially the original electrolyte, is pumped by the pump 18' through the pipe 17 provided with the valve 17' to the supply tank 1, and may be used over again. The lead carbonate formed in the tank 15 may be drawn off through the pipe 18, run through a filter press and prepared for use.

Instead of precipitating lead carbonate from the solution of lead nitrate or other soluble salt of lead which is discharged by the pipe 8 into the precipitating tank 15 by means of an alkaline carbonate, I may discharge the sodium hydrate into the tank 15 and at the same time pass carbon dioxid from the generator 19 through the solutions in said tank 15, thereby producing lead carbonate.

For the purpose of preventing the anolyte from becoming unduly alkaline, because of the liberation of nitrous oxid during the decomposition of the nitric acid in the anode compartment, or from any other cause, and for preventing the resulting formation of insoluble lead salts, I provide means for introducing an oxidizing agent into the anode compartment. In the process herein described, this oxidizing agent consists of nitric acid which may be conveniently produced in the electrolyzing tank 20, by passing an electric current through the electrolyte supplied to said tank from the supply tank 1, by means of the pipe 23, provided with the valve 23'. Said tank 20 is provided with two foraminous diaphragms 21 and 21', and contains an anode 22 of carbon, and a cathode 22' of copper. Nitric acid is produced by the electrolytic decomposition of the sodium nitrate with which the tank 20 is charged, and is conveyed by the pipe 24, which is provided with the valve 24', into the anode compartment 3' of the tank 3. Sodium hydrate is produced in the cathode compartment of the tank 20, and may be discharged through the pipe 25, provided with the valve 25', into the cathode compartment of the electrolzyer 3. However other suitable oxidizing agents may be used in place of the nitric acid above referred to.

By means of the direct process herein described, I am enabled to produce white lead of a character that, for some purposes, is preferred to that produced by the indirect process set forth in the hereinbefore mentioned Letters Patent. The process is continuous, and in addition to the lead and carbon dioxid consumed, requires only the addition from time to time of fresh quantities of the electrolyte.

I claim:

1. As an improvement in the art of producing white lead by electrolysis, the process herein described which consists in electrolytically separating an electrolyte into a solvent of lead and an alkaline hydrate, dissolving metallic lead by said solvent thereof, electrolytically producing an oxidizing agent and adding the same to the resulting soluble salt of lead to prevent the formation of insoluble salts of lead, withdrawing said soluble salt of lead, withdrawing and carbonating said alkaline hydrate, thereby producing an alkaline carbonate and then directly carbonating said soluble salt of lead with said alkaline carbonate to produce white lead.

2. As an improvement in the art of producing white lead by electrolysis, the process herein described which consists in electrolytically separating an electrolyte into a solvent of lead and an alkaline hydrate, producing by the action on lead of said solvent a solution of a soluble salt of lead, adding an oxidizing agent to said solution of said soluble salt of lead to prevent the formation of insoluble salts of lead, withdrawing said solution of said soluble salt of lead, withdrawing and carbonating said alkaline hydrate and thereby producing an alkaline carbonate, and then directly carbonating said soluble salt of lead with said alkaline carbonate to produce white lead.

In testimony whereof, I have hereunto subscribed my name this fifth day of Jan. 1906.

EDWIN D. CHAPLIN.

Witnesses:
CHARLES C. KURTZ,
GEO. K. WOODWORTH.